April 13, 1965  R. F. WILLIAMS ET AL  3,178,104
BEARING LUBRICATION SYSTEM FOR COMPRESSOR APPARATUS
Filed Aug. 20, 1962  4 Sheets-Sheet 1

RAYMOND F. WILLIAMS
SYLVESTER L. ANERINO
INVENTORS

BY Joseph W. Holloway
ATTORNEY

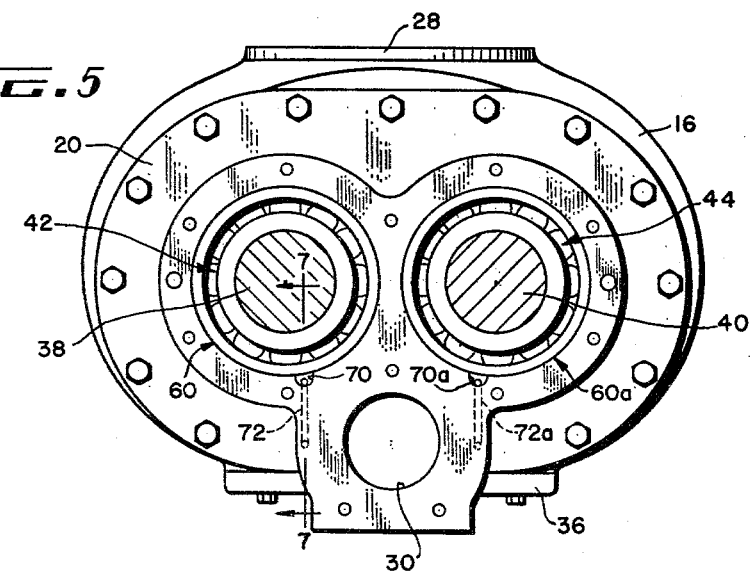
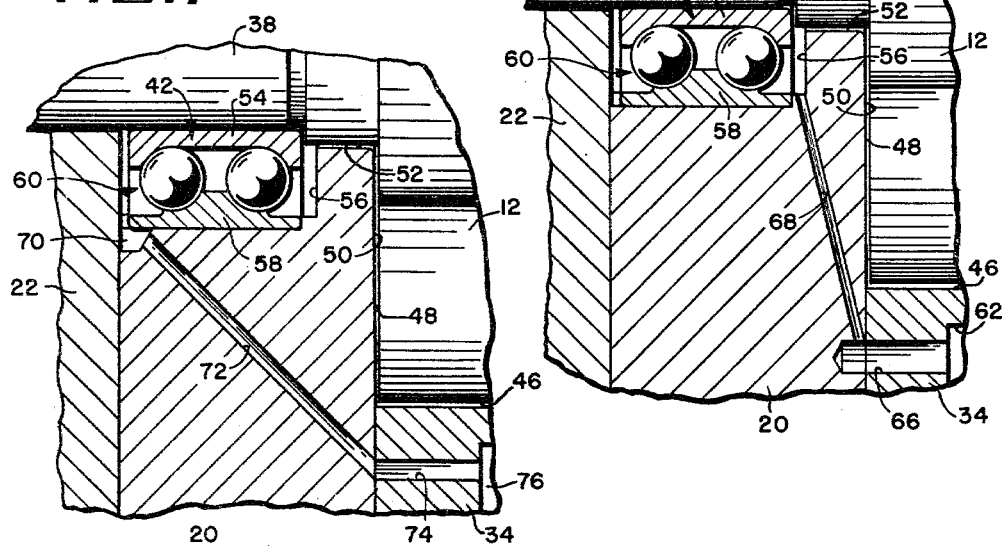

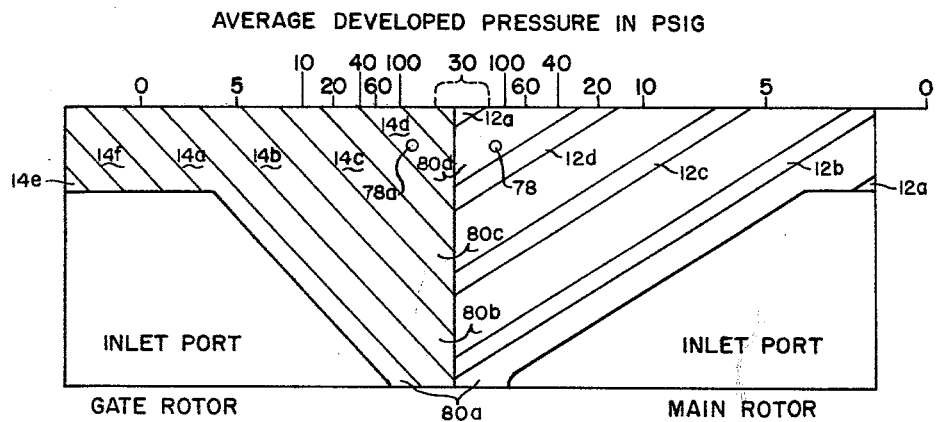

3,178,104
BEARING LUBRICATION SYSTEM FOR
COMPRESSOR APPARATUS
Raymond F. Williams and Sylvester L. Anerino, Quincy,
Ill., assignors to Gardner-Denver Company, a corporation of Delaware
Filed Aug. 20, 1962, Ser. No. 217,981
4 Claims. (Cl. 230—207)

The present invention generally relates to compressor apparatus and, more particularly, to lubrication of bearings journalling the rotative operating means of apparatus for compressing air and other gases.

A general object of the present invention is to provide a lubrication system for compressor bearings whereby volumetric losses in air output and reduced operating efficiency heretofore encountered because of air leakage around and through the compressor bearings are substantially reduced, if not eliminated.

Another object is the provision of a lubricating system for bearings journalling rotors of rotary compressors wherein air leaking past the ends of the rotors into the beaing chambers is entrained with the bearing lubricant thereby creating an air-oil foam which is communicated from the bearing chambers to a compression cell within the compressor by means of a closed system.

A further object is to communicate lubricant-entrained leakage air from the bearing chambers to a selected compression cell within the compressor by means of an air pressure differential obtaining between the bearing chambers and the selected compression cell.

A still further object is to communicate lubricant-entrained leakage air from the bearing chambers to a compression cell within the compressor where the developed air pressure in the compression cell has reached a predetermined value substantially greater than compressor inlet pressure.

A more specific object is to provide a bearing lubricating system of the aforedescribed character which is particularly well adapted for use in screw-type compressors having a plurality of movable compression cells which exhibit a pressure gradient from inlet pressure to discharge pressure along the length of the compressor housing.

A still more specific object is to provide a compressor having an improved lubricant gallery which facilitates the return of lubricant and lubricant-entrained air from bearing chambers directly through the casing member of the compressor housing to a selected compression chamber within the compressor.

Yet another specific object is to provide a bearing lubricating system of the aforedescribed type which is characterized by simplicity of construction, low cost and high efficiency.

There and other more detailed objects and advantages and means for their attainment will appear upon reading the following specification and appended claims and upon considering in conjunction therewith the attached drawings in which:

FIG. 5 is an end view of the bearing housing shown in FIG. 4 taken along lines 5—5 of FIG. 1;

FIG. 6 is a fragmentary sectional view taken along lines 6—6 of FIG. 4;

FIG. 7 is a fragmentary sectional view taken along lines 7—7 of FIG. 5; and,

FIG. 8 is a diagramatic development of the compressor housing and rotors illustrating representative developed pressure values in the compression cells defined by the rotating rotors and the stationary housing.

Figure 1:
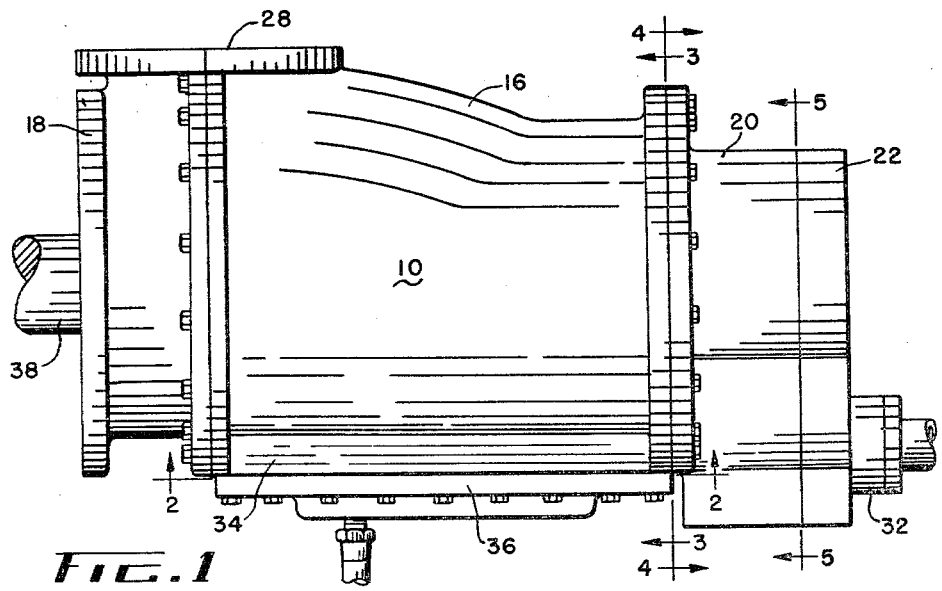
FIG. 1 is an elevational view of a screw-type compressing embodying a bearing lubrication system constructed in accordance with the present invention.

The illustrative compressor apparatus is of the rotary screw type and comprises a stationary housing, indicated generally by numeral 10, and a pair of complementary, meshing rotors 12 and 14 which are rotatively journalled within the housing. As shown in FIG. 1, the plural-part housing comprises a central cylinder or casing 16 which is closed at opposite ends by removable end walls or heads 18 and 20. The casing and the heads are provided with suitable abutting flanges for securing the latter in place; and a bearing cover plate 22 is removably secured to the head 20. The casing 16 is provided with intersecting parallel bores 24 and 26 which are in open communication with an inlet port 28 opening substantially radially through casing 16 and the inlet-end head 18 and with a discharge port 30 opening substantially axially through the discharge-end head 20 and the bearing cover plate 22 to an external discharge pipe 32. The casing base 34 is provided with certain cavities to be hereinafter described and is closed by a removable base cover plate 36.

Figure 3:
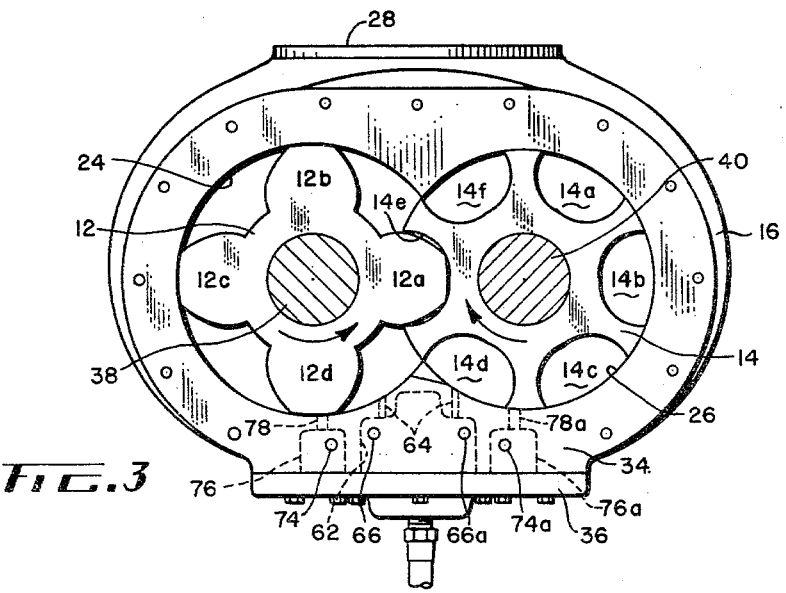
FIG. 3 is an end view of the compressor taken along line 3—3 of FIG. 1 as viewed in the direction indicated by the attached arrows.

As best illustrated in FIG. 3, the compressor operating means, i.e. rotors 12 and 14, comprise complementary helical screw thread members which are rotatively journalled in the parallel bores 24 and 26. Rotor 12 has four generally convex lobes 12a–d and is commonly denominated the main rotor; and, rotor 14 has six generally concave grooves 14a–f and is commonly denominated the gate rotor. The rotors 12 and 14 are provided with reduced diameter shaft extensions 38 and 40 which are preferably formed integrally and coaxially with the central body portions of the respective rotors. The extending rotor shafts 38 and 40 are rotatively journalled at opposite ends by antifriction bearing assemblies mounted in the heads 18 and 20. FIG. 5 shows bearing assemblies 42 and 44, mounted in the discharge head 20, which support and journal rotor shafts 38 and 40, respectively; and, other bearings, not shown, which are mounted in the inlet head 18, coact with the opposite ends of rotor shafts 38 and 40 in a similar manner. The main rotor shaft 38 extends beyond the inlet head 18, as shown in FIG. 1, for driving engagement with a suitable rotary power source, not shown. Preferably the cooperating rotors are synchronized or timed to provide interrotor clearance by means of suitable timing gears, not shown, mounted on the inlet ends of the rotor shafts 38 and 40. In an exaggerated manner, FIGS. 6 and 7 show a radial clearance space 46, between the crests of the rotors 12 and 14 and the surrounding walls of the bores 24 and 26, and an axial clearance space 48 between the discharge end surfaces of rotors and the adjacent surface 50 of the discharge head 20.

Referring particularly to the discharge head shown in FIGS. 6 and 7, where the bearing assembly 42 for the main rotor shaft 38 is shown in detail, the shaft 38 penetrates an opening 52 through the head 20 and extends axially therethrough into engagement with the surrounding inner race 54 of bearing assembly 42. Shaft 32 extends coaxially through the inner race 54 and projects into the bearing cover plate 22 which mounts a suitable sealing device, not shown, in gas sealing relation with the shaft. A stepped annular recess 56 is relieved in the head 20 in coaxial relationship with the shaft opening 52; and, the outer race 58 of the bearing assembly 42 is seated in recess 56. From the foregoing, it will be understood that the bearing assembly 42 is disposed within chamber 60 defined by the recess 56, the shaft 38 and the bearing cover plate 22. The aforedescribed structural details of the main rotor bearing assembly 42 and the method of mounting the same are equally descriptive of the bearing assembly 44 journalling the discharge end of the gate rotor 14.

Figure 2:
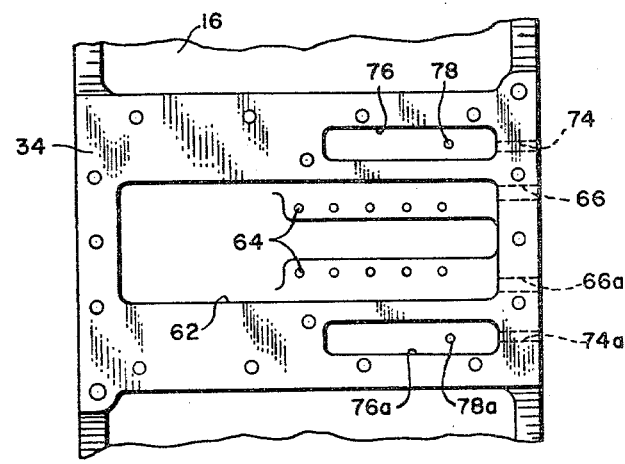
FIG. 2 is a bottom view of the compressor housing taken lines 2—2 of FIG. 1 showing the oil gallery cover removed.
Figure 4:
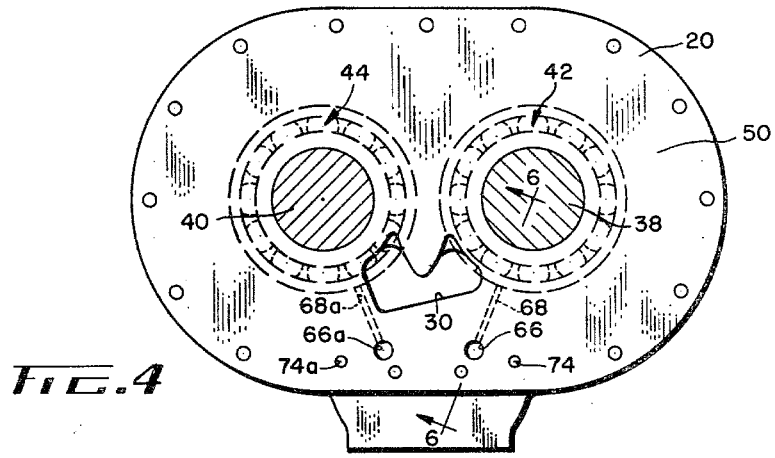
FIG. 4 is an end view of a bearing housing taken along lines 4—4 of FIG. 1 as viewed in the direction indicated by the attached arrows.

In compressor apparatus of the type presently under consideration, a suitable lubricating medium, such as light weight motor oil, may be supplied under pressure to an oil gallery or cavity 62 relieved in the casing base 34 and closed by the base cover plate 36. Oil supplied to the gallery may then be injected into the interior of the casing 16 through a plurality of spaced apertures 64 for the combined purposes of cooling, sealing and lubricating the meshing rotors during normal compressor operation. The injected oil is usually expelled with the compressor discharge air and is subsequently removed therefrom by suitable filter means and pumped back to the oil gallery for reuse. As shown by FIGS. 3, 4, and 6, the discharge end of gallery 62 communicates with the aforementioned bearing chamber 60 by means of connecting bores 66 and 68, respectively defined in the casing base 34 and the discharge head 20. In the usual manner, the oil supplied to the bearing chamber 60 circulates around and through the bearing assembly 42 to lubricate and cool the same. Thereafter, as shown in FIGS. 5 and 7, the oil will flow out from the bearing chamber 60 through a return passage comprising a generally semi-circular recess 70, a bore 72 in the discharge head 20, and a connecting bore 74 in the casing base 34 opening to a cavity 76 offset from the gallery 62. The gallery 62 and the cavity 76 are discrete, i.e. they are not interconnected by any passage means in the casing base 34 or in the base cover plate 36. As best illustrated in FIGS. 2 and 3, an aperture 78 opens radially to the main rotor bore 24 thereby communicating oil from the cavity 76 to the interior of the casing 16. The lubricating system for the gate rotor bear assembly 44 is identical in structure and operation to that described above in connection with the main rotor bearing assembly 42; however, in the drawings, the letter "a" has been attached to numerals identifying duplicate portions of the lubricating system for the gate rotor bearing assembly 44.

In the illustrative air compressor, a plurality of working chambers or compression cells are formed by the mating main rotor lobes 12a–d and gate rotor grooves 14a–f as the rotors rotate in opposite directions and in approximate contact with the walls of the casing bores 24 and 26. As the rotors rotate, the working chambers or cells sequentially open to their full volume and fill with air while in communication with the inlet port 28. Thereafter, due to entrance of the helical main rotor lobes 12a–d into mating gate rotor grooves 14a–f, the volume of air contained in the cells is progressively reduced by the shortening of the length of each cell from its inlet end to its discharge end; and, with a decrease in volume, the pressure in the cell is progressively raised from inlet pressure to discharge pressure. Thus the compression cells are axially displaced toward the discharge port 30 and brought into sequential registration therewith as the rotors revolve in mating relation. From the foregoing, it will be understood that the several cells defined by the rotors have different developed pressures therein at any instant. Furthermore, FIGS. 3, 6, and 7 indicate that the discharge end of these several cells, while almost closed by the adjacent face 50 of the discharge head 20, in fact, communicate with the bearing chambers 60 and 60a through leakage passages defined by the aforementioned clearance spaces 46 and 48 and the running clearance between the rotor shafts 38 and 40 in the discharge head 20. Thus, during normal compressor operation, air flows under pressure from the various compressor cells into the bearing chambers 60 and 60a and produces a resultant air pressure therein.

Observation of compressor apparatus having various final discharge pressures and acceptable clearances have shown that a volume of leakage air on the order of two percent of the rated volumetric output escapes into the bearing areas of the compressor and there becomes entrained in the bearing lubricating oil to form an air-oil mixture having the character of foam. It has been observed that the pressure in the bearing chambers due to the presence of leakage air therein ranges from about 40 to 70 percent of the final discharge pressure of the compressor. Heretofore, in conventionally constructed compressor apparatus, the aforementioned air-oil foam in the bearing chambers has been returned either to the inlet port of the compressor or to an oil sump, both of which are conventionally at or very near atmospheric pressure. In either case, the air component of the air-oil foam may be allowed to expand and to escape to atmosphere with a concomitant loss in available output air volume. Moreover, returning the air-oil foam from the bearing chambers 60–60a to an area which is at or near atmospheric pressure would entail the loss of that energy which is required to compress the air component of the foam initially to the resultant pressure obtaining in the bearing chambers. Such loss of energy has been found to comprise about one percent of the horsepower input to the compressor.

An important feature of the present invention is the provision of return passages for conducting the aforementioned air-oil foam from the bearing chambers 60–60a to a selected cell within the compressor wherein an air pressure substantially greater than atmospheric has been developed by rotation of the operating members of the compressor. In order to utilize differential air pressure to assist in the return of the air-oil foam from the bearing chambers, the pressure in the selected cell must be less than the aforementioned resultant air pressure in the bearing chambers. These features and the improved results derivable therefrom will be more clearly understood by referring to FIG. 8 which is a diagrammatic development of the casing 16 and the main and gate rotors of an exemplary apparatus intended to compress air from atmospheric pressure to approximately 100 p.s.i.g. With the main and gate rotors in the position shown in FIG. 8, a cell 80a is in radial and axial communication with the inlet port 20 and receives a full charge of air at inlet pressure, or in this case zero p.s.i.g. The cells 80b, 80c, and 80d have rotated past the marginal edges of the inlet port and the volumes of the respective cells have been progressively reduced due to the progressively greater entrance of the lobes 12b–d into the grooves 14b–d. It will be noted that the cell 80d is in position to open to the discharge port 30 and that further rotor rotation will completely exhaust cell 80d at a final discharge pressure of about 100 p.s.i.g. It will also be noted that the developed cell pressures increase as the cells are displaced axially from the inlet port to the discharge port.

According to the present invention, the apertures 78–78a radially penetrate the casing 16 to communicate the pressurized air-oil foam from the bearing chambers 60–60a to a selected compression cell defined within the casing 16. In the illustrative embodiment of the invention shown in FIG. 8, the apertures 78–78a are shown in communicaiton with the cell 80d; however, it will be understood that the apparatus 78–78a sequentially communicate with each of cells 80a–80d as the cells are displaced axially from the inlet end of the casing 16 to the discharge end. As FIG. 8 indicates, the aperture 78 communicates with cell 80d after the trailing edge of the main rotor lobe 12a overrides the aperture opening and before the leading edge of lobe 12d covers the aperture opening. The aperture 78a communicates with cell 80d during the period that the gate rotor groove 14d is in communication with that aperture opening. During the period of communication between cell 80d and the apertures 78-78a, the average pressure developed in cell 80d is approximately 35 p.s.i.g.; therefore, it may conveniently by said that the bearing chambers 60-60a are connected by means of apertures 78-78a to the 35 p.s.i.g. developed pressure point of the compressor. It will be appreciated that infinitely variable developed pressure points, ranging from inlet pressure to discharge pressure, may be selected by locating the apertures 78-78a at selected positions along the length of casing 16.

Assuming a resultant pressure in the bearing chambers 60-60a of 40 p.s.i.g., the advantages of the present invention may best be realized by locating the apertures 78-78a for communication with a cell in which a somewhat lower pressure, 35 p.s.i.g. for example, has been developed. Such a selected location will produce a 5 p.s.i.g. pressure differential between the bearing chambers 60-60a and the selected cell, thereby insuring a continuous flow of air-oil foam from the bearing chambers. Preferably, the selected developed pressure point is as near to the resultant pressure in the bearing chambers as is practical while yet providing a foam-moving pressure differential. In the example given above, the pressure differential is limited to about 5 p.s.i.g. which means that the air component of the foam received into the 35 p.s.i.g. pressure point of the compressor is permitted to expand only sufficiently to produce a 5 p.s.i.g. drop in pressure. Thus the greater part of the work expanded in compressing the air component of the foam to the resultant pressure of 40 p.s.i.g. in the bearing chambers is preserved instead of being lost, as would be the case if the foam were communicated to the inlet port or some other point at or near atmoshperic pressure. Since the foam is returned to a cell which has rotated past the inlet port 30, it may be said that the air component of the foam is recirculated to the interior of the compressor by means of a closed system. Thus the volume of air which leaks into the bearing chambers is returned to a compression cell and is substantially discharged without an undesirable diminution in output volume due to such leakage.

It will be apparent that insofar as the feature of the invention relating to return of leakage air is concerned, this feature is equally applicable to plural-stage as well as single-stage compressors. Moreover, it will be understood that the above description and examples comprehend only a general embodiment of the invention and that various changes in construction, proportion, operating pressures and the arrangement of elements thereof may be made without sacrificing any of the above enumerated advantages or departing from the scope of the following claims.

What is claimed as new and useful is:

1. In a gas compressor apparatus:
  housing means having gas inlet and discharge openings;
  rotatable operating means disposed in said housing means and cooperable therewith to provide a plurality of cells wherein the gas pressure developed in individual cells is progressively increased from inlet pressure to discharge pressure in response to rotation of said operating means;
  at least one bearing chamber defined by said housing means;
  bearing means disposed in said bearing chamber and rotatively journaling said operating means;
  first passage means in said housing means communicating lubricating medium to said bearing chamber;
  second passage means between said operating means and said housing means communicating gas from a plurality of said cells to said bearing chamber thereby to produce a resultant gas pressure in the latter; and
  third passage means in said housing means communicating lubricating medium and gas entrained therewith from said bearing chamber to a selected cell wherein developed gas pressure is less than said resultant gas pressure.

2. The invention according to claim 1, wherein said operating means comprise a main rotor and a gate rotor, said main rotor having helical convex lobes and said gate rotor having helical concave grooves; and, said lobes and grooves intermesh to form said cells.

3. The invention according to claim 2, wherein said third passage means includes a cavity formed in said housing means together with an aperture opening from said cavity through said housing means to said selected cell.

4. The invention according to claim 3, wherein said individual cells, including said selected cell, move axially with respect to said housing means in response to rotation of said operating means; and, said aperture being axially located along said housing means to register with said selected cell when developed gas pressure therein has reached a predetermined value.

References Cited by the Examiner
UNITED STATES PATENTS

| | | | |
|---|---|---|---|
| 1,409,868 | 3/22 | Kien | 230—143 |
| 3,063,378 | 11/62 | Hart | 230—207 X |

LAURENCE V. EFNER, *Primary Examiner.*

JOSEPH H. BRANSON, JR., *Examiner.*